March 17, 1936.     R. F. STEPBACH     2,034,065
BASKET HANDLE
Filed June 6, 1933
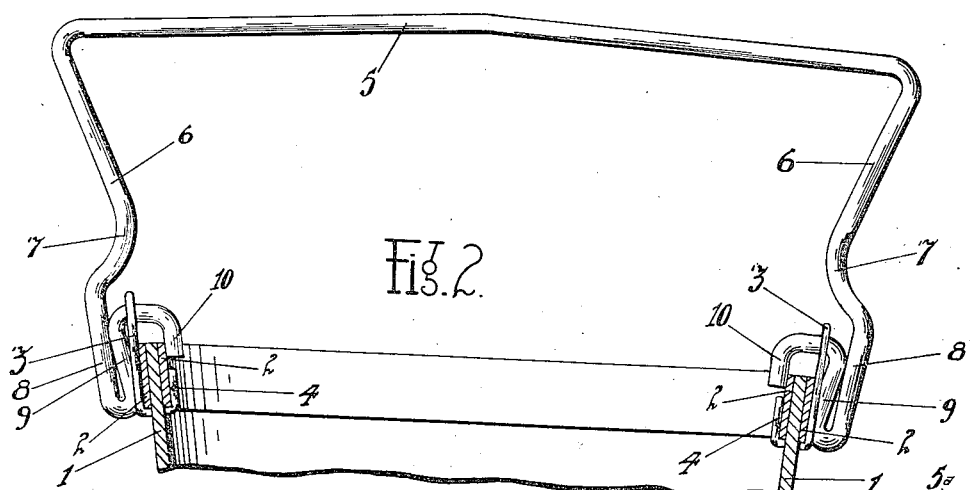
INVENTOR.
ROBERT F. STEPBACH.
BY Philip S. Hopkins
ATTORNEY.

Patented Mar. 17, 1936

2,034,065

UNITED STATES PATENT OFFICE 2,034,065

BASKET HANDLE

Robert F. Stepbach, Binghamton, N. Y., assignor, by direct and mesne assignments, of one-half to E. H. Titchener & Co., Binghamton, N. Y., a corporation of New York, and one-half to Mushroom Supply Co., Toughkenamon, Pa.

Application June 6, 1933, Serial No. 674,539

4 Claims. (Cl. 217—125)

My invention relates to basket handles and particularly to handles for the type of baskets or boxes usually used for mushrooms, fruit, berries, grapes, vegetables and other like goods.

It is frequently the practice to fill such baskets directly during the picking process, the baskets being carried to the fields or orchards for use by the pickers.

The handles provided for baskets of this type have in the past been of two types, the removable type and the fixed type, the latter secured permanently to the basket. The removable type is in many instances preferable, it being less expensive in that it eliminates the time and labor required for permanently securing the other type of handle to the baskets.

By the term "removable" handle I refer to a handle which is readily attachable to a basket or box without piercing the same or otherwise permanently securing the handle thereto. My improved handle is not intended for removal from the basket after once being attached thereto, and, as a matter of fact is difficult to remove. It distinguishes from the permanently attached type, however, in that it is readily attached and may be removed if desired.

Difficulty has been encountered, however, in the use of these removable handles in that no means has been provided for maintaining the handles in an upright carrying position during the process of filling the basket and prior to placing the cover thereon. Baskets of this type are usually provided on each side with fixed wire loops or eyelets through which the ends of the handle are inserted and by which the handle is removably attached to the basket. With the ordinary type of removable handle thus attached to a basket, the handle will of its own weight turn in the supporting loops and drop down on the top of the basket where it is in the way and interferes with the speedy and proper filling and packing of the basket, and prevents the ready and convenient use thereof.

The principal object of my invention is to provide a basket handle of the desirable removable type which may be readily and quickly secured to the basket through the usual loop supports thereon and which is so constructed and formed that it automatically maintains its upright carrying position at all times.

A further object lies in the provision of means for both frictionally maintaining the handle in upright position and positively limiting its movement in such position.

Another object of my invention lies in the provision of a handle of this type which is simple and economical to manufacture, easily attached to the basket, and which embodies the various desirable features of a handle for this purpose.

Basket handles for this purpose and of this general type are usually formed of wire bent to the desired shape. I have illustrated my improved handle in this wire form but it will be understood that I do not limit myself to wire as the invention is obviously adaptable to handles of other materials which may be bent and formed as disclosed herein.

Other objects and advantages will be apparent as the description proceeds, reference now being had to the figures of the accompanying drawing forming a part of this application and wherein like reference numerals indicate like parts.

In the drawing:

Figure 1 is a side view of a basket of the type for which my invention is particularly adapted.

Figure 2 is a detail sectional view of the upper portion of a basket illustrating clearly the manner of attachment and operation of my improved handle.

Figure 3 is a detail view illustrating the hand grip portion of a modification of my improved handle.

Figure 4 is a detail view of one end of such modified handle.

Figure 5 is a detail view of the opposite end of such handle.

Figure 6 is a detail broken view of the hand grip portion of a still further modification.

Figure 7 is a detail view of one end of this modification.

Figure 8 is a detail view of the opposite end thereof.

Figure 9 is a broken end view of the handle.

The reference character 1 refers generally to a basket which may be of any desired size or shape and which is usually provided around its top edge with the reinforcing strips 2. Permanently fixed to the upper edge of the basket and at points directly opposite each other are the supporting loops 3 usually provided of wire bent to the form shown in Figure 1 and having the free ends thereof passing through the side walls of the basket 1 and bent upwardly on the inside as at 4 whereby to permanently and securely hold these supporting loops in position on the basket. It is through these loops 3 that the ends of my improved handle are attached whereby the handle is fastened on the basket.

My improved handle is preferably, though not necessarily, made of wire bent to form the hand grip 5 of conventional shape and the length depending, of course, upon the size of the basket. At the ends of the hand grip portion 5 of the handle, the handle is bent downwardly and inwardly as at 6 for a substantial distance to provide adequate space between the grip 5 and the basket to conveniently receive the hand of the carrier. The side portions of the handle are then again bent outwardly as at 7 and then again downwardly and preferably slightly inwardly as at 8. By the terms "outwardly" and "inwardly" I refer respectively to away from the basket and towards the basket.

The material forming the handle is then bent back upon itself for a short distance as at 9 and then again inwardly and downwardly as at 10, these bends terminating with the ends of the handle. It will be noted that the angle between the bent portions 9 and 10 is large enough to readily permit the insertion of the ends 10 through the loops 3 and over the upper edge of the basket whereby to removably secure the handle to the basket. The bend provided between the portions 9 and 10 serves as the loop engaging portion of the handle and by which the basket may be lifted.

It will be clear from Figure 2 that the portions 9 of the handle are disposed at a decided angle to the upper edge of the basket due to such portions 9 being bent back upon and conforming to the same inward angle as the portions 8. The effect of this angular position of the portions 9 is to cause the same, adjacent the connecting bends with the portions 8, to frictionally engage against the outer reinforcing strip 2 at the upper edge of the basket, or in the absence of such a strip, directly against the basket itself. Thus there is provided a binding action between the ends of the handle and the sides of the basket, facilitated in a measure by the ends 10 of the handle overlying the upper edge of the basket, which serves to frictionally maintain the handle in its upright carrying position and prevents its turning within the loops 3 and dropping down upon the top edge of the basket.

It will be noted too in connection with Figures 1 and 2, that these basket engaging portions 9 of the handle lie between the legs or sides of the loop member 3 on the outside of the basket, such portions of the loop 3 serving as a positive limiting means to the pivotal movement of the handle on the basket in upright position. Thus if there is insufficient friction between the handle and basket to hold it upright, the handle will still be positively held in its carrying position by the legs of the loops 3, between which the handle portions 9 lie.

In the preferred form, as illustrated in Figures 1 and 2, all of the bends as heretofore described are in the same plane, the entire handle with the various turns and bends providing the ends thereof thus lying in the same plane. This is illustrated clearly in Figure 1.

In Figures 3, 4 and 5, a slightly modified form of handle is illustrated and in which the hand grip 5a as well as the portions 6a, 7a, and 8a, correspond closely with the portions 5, 6, 7 and 8 previously described. The portion 9a, however, instead of being bent back upon the portion 8a in the same plane therewith, is bent in the same manner but laterally to the portion 8a and directly adjacent thereto, as shown in Figure 5. The end portion 10a corresponds exactly to the end portion 10 previously described.

Thus the difference between this handle and that illustrated in Figures 1 and 2 and described in connection therewith lies only in the lateral disposition of the portions 9a with respect to the other portions of the handle. This arrangement obviously provides a greater friction binding surface at the bend between portions 8a and 9a for engagement with the sides of the basket. In this modification, both of the bent portions 9a—10a are disposed on the same side of the handle.

In Figures 6, 7 and 8 there is illustrated a still further modification duplicating in every respect the handle shown in Figure 3 with the parts 5b, 6b, 7b, 8b, 9b, and 10b, identical with the parts 5a, 6a, 7a, 8a, 9a, and 10a of Figure 3 with the exception that the portions 9b—10b of this modification are positioned on opposite sides of the handle.

From the foregoing it will be clear that I have provided a novel basket handle readily engageable with the supporting loops of a basket and which is so designed and constructed that the handle is maintained in its upright carrying position at all times.

Of course, changes may be made in details of construction and arrangement of parts without departing from the spirit and scope of my invention. I do not limit myself, therefore, to the exact form herein shown and described other than by the appended claims.

I claim:

1. In combination with a basket having separate supporting loops thereon, a handle having a hand grip portion and ends bent to provide loop engaging portions, said handle being bent toward said basket adjacent said loop engaging portions for frictional engagement with the outside walls of said basket whereby said handle is maintained in upright position on said basket.

2. In combination with a basket having separate supporting loops thereon, a handle having a hand grip portion and ends bent to provide loop engaging portions, said handle being bent toward said basket adjacent said loop engaging portions for frictional engagement with said basket between parts of said loop portions.

3. In combination with a basket having separate supporting loops thereon, and a handle having a hand grip portion and end portions, said end portions being bent to provide separate loop engaging members and basket engaging members, said last named members being positioned below said loop engaging members and bent to frictionally engage the outside walls of said basket whereby said handle is maintained in upright position.

4. In combination a basket having separate supporting loops thereon and extending upwardly from the edges of said basket, a handle having a hand grip portion and end portions, said end portions being bent upon themselves and angularly to said basket for frictionally engaging said basket whereby said handle is maintained in upright position, the extreme free ends of said end portions engaging in said loops.

ROBERT F. STEPBACH.